United States Patent Office 2,867,354
Patented Jan. 6, 1959

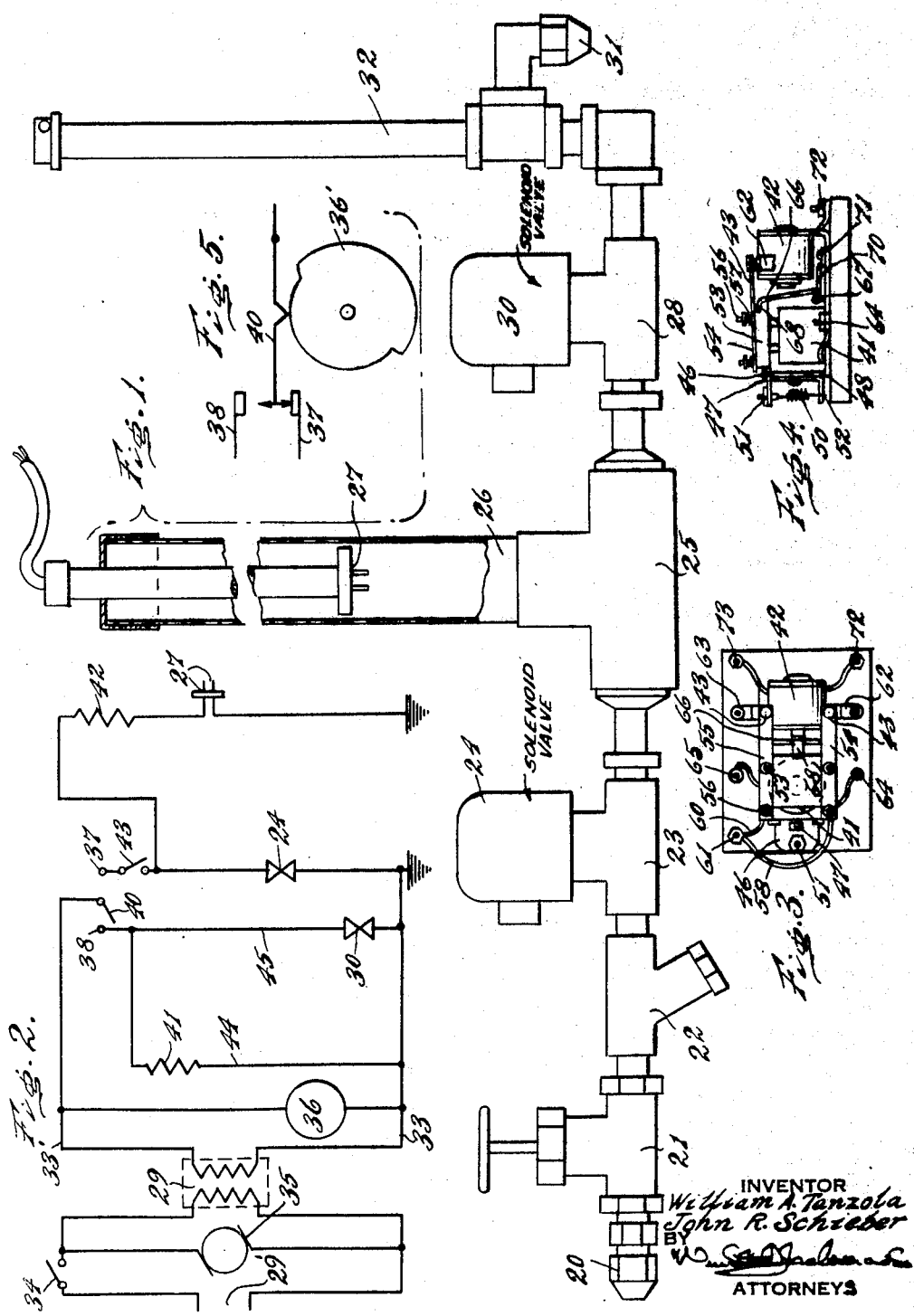

2,867,354

LIQUID DISPENSING MECHANISM

William A. Tanzola, Havertown, and John R. Schieber, Horsham, Pa., assignors to Betz Laboratories, Inc., Philadelphia, Pa., a corporation of Pennsylvania Application June 12, 1957, Serial No. 665,178

5 Claims. (Cl. 222—64)

The present invention relates to simplified liquid dispensing mechanisms of the type which discharge a measured quantity of liquid from a dispensing system to a main system at periodic intervals.

The present application is a continuation-in-part of our copending application Serial No. 593,861, filed June 26, 1956, for Liquid Dispensing Mechanism, now abandoned.

A purpose of the invention is to reduce the equipment required and the cost of initial manufacture and maintenance of liquid dispensing systems.

A further purpose is to provide a liquid dispensing system including a source of liquid under pressure and a discharge pipe through which the liquid is dispensed to a main system, with a measuring container, an inlet valve between the source and the measuring container, an outlet valve between the measuring container and the discharge pipe, electrical means operative when the measuring container is emptied for closing the outlet valve and opening the inlet valve, electrical means responsive to the level of the liquid in the measuring container for closing the inlet valve, a timer and electrical means responsive to a timer for opening the outlet valve.

A further purpose is to make the electrical means for closing the outlet valve and opening the inlet valve respond to a timer.

A further purpose is to employ a liquid contact switch for closing the inlet valve.

A further purpose is to utilize a relay having a relay switch-opening coil in a circuit branch in series with a liquid contact swtch, having a relay switch, and having a relay swtch-closing coil, the electrical means for opening and closing the valves including solenoids, and the timer having a normally closed switch and a normally open switch, the normally closed switch being in a circuit branch in series with the relay switch and with two parallel circuit branches, one including the relay switch-opening coil and liquid contact switch and the other including the inlet valve solenoid, the normally open switch being in series with two parallel circuit branches, one including the outlet valve solenoid and the other including the relay switch-closing coil.

A further purpose is to combine the dispensing mechanism with a circulating pump for circulating liquid in the main system to which the liquid is dispensed, and a control switch for the circulating pump which also operates the dispensing system.

Further purposes appear in the specification and in the claims.

In the drawings we have chosen to illustrate one only of the numerous embodiments in which our invention may appear, selecting the form shown from the standpoints of convenience in illustration, satisfactory operation and clear demonstration of the principles involved.

Figure 1 is a diagrammatic side elevation of the liquid dispensing system of the invention.

Figure 2 is an electrical circuit diagram of the device of Figure 1.

Figure 3 is a diagrammatic top plan view of a relay useful in the invention.

Figure 4 is a diagrammatic side elevation of the relay of Figure 3.

Figure 5 is a diagrammatic view of a timer useful in the invention.

There are numerous requirements for simplified liquid dispensing systems, which avoid the expense and complexity incident to metering pumps and control systems therefor.

One typical illustration is the prevention of corrosion in the cooling system of an air conditioning mechanism. In air conditioning devices of the type in which a medium is compressed by a compressor and then passed through a heat exchanger of the evaporative type, and then passed to an evaporator where air is cooled, there is a problem in avoiding or minimizing corrosion and formation of scale in the water which is used in the evaporative condenser. This water is normally carried through a sump and then recirculated. Many of these systems are not fully attended, and it is necessary to supply the stock chemical treating solution in predetermined increments.

The present invention provides a device which adds periodic increments of the treating chemical, which may suitably be a water soluble chromate and a water soluble phosphate, according to Kahler U. S. Patent No. 2,711,391, issued June 21, 1955, for Phosphate-Chromate Corrosion Protection in Water Systems. The invention is also applicable to the treating of water in air washers and towers, for feeding acid or chemicals to process water, and feeding chemicals to humidifiers in domestic and commercial applications. The device lends itself well to operation automatically, subject to servicing at intervals by a service man who is checking the air conditioning or similar system generally.

The equipment is particularly suitable to installations where the quantity of water handled is relatively small.

The system comprises a measuring container which may be suitably a measuring column, with an inlet valve at one side, an outlet valve at the other side, and means for alternately opening the inlet valve and charging the measuring container, closing the inlet valve, then opening the outlet valve and discharging the measuring container. The quantity of liquid entering the measuring container is preferably controlled by the electrical conductivity of the liquid itself which in effect operates as a limit switch to cut off the inlet.

If we consider an air conditioning cooling system, a recirculating pump is provided which circulates the water in the evaporative condenser when the system is thermostatically, or by a pressure switch, brought to the evaporative condensing phase of the cycle. This occurs when there is Freon or other medium requiring cooling. The pump runs only when the system calls for refrigerant condensation. As soon as this pump starts, a timer in the device of the present invention operates and the timer is set to time out at a predetermined interval.

Considering now the system in detail, an inlet pipe 20 connects to a normally open valve 21 used for shut-off purposes, and then to a strainer 22 and an inlet valve 23 which is normally closed under the weight of its internal plunger and is opened by solenoid 24. The inlet valve then connects to a T-shaped fitting 25 at the bottom of a measuring column 26 which extends upwardly and at a level corresponding to the top has liquid contact switch 27 containing electrodes which are in contact with the liquid when it rises to a predetermined level. The T-shaped fitting at the opposite side connects to an outlet valve 28 normally closed under the weight of its internal plunger and opened by solenoid 30, and then connects by discharge connection 31 to the evaporative condenser or other main system. A suitable vent pipe is provided at 32.

The electrical system includes lines suitably supplied through isolating transformer 29 and a system control switch 34 to an alternating current source of commercial frequency 29'. A pump motor 35 which circulates the cooling water in the main system, as previously explained, is connected across the alternating current source beyond the system control switch. The system control switch will suitably be of the thermostatic or pressure type as desired. On the output side the isolating transformer is connected to an ungrounded lead 33' and a grounded lead 33.

Also connected across the lines is a timer motor 36 operating a cam 36' and having a normally closed contact 37, a normally open contact 38 and a movable cam-operated contact 40. A relay is used, which is preferably a single pole normally open double-break contact latch relay having a relay switch-closing coil 41, a relay switch-opening coil or relay latch coil 42 and a relay switch 43.

The normally open contact 38 is connected by the movable contact 40 of the timer when the timer times out to line 33', and the contact 38 is connected to circuit branch 44 including relay switch-closing coil 41 and also to circuit branch 45 in parallel therewith across the line and including outlet valve solenoid 30.

In normally closed position the movable contact 40 connects with normally closed contact 37 which is in series across the line with relay switch 43 and inlet valve solenoid 24. Normally closed contact 37 and relay switch 43 also are in series across the line with relay switch-opening or latch coil 42 in series with relay switch 43 and liquid contact switch 27 to ground.

The relay preferably used is shown in one embodiment in Figures 3 and 4.

The relay armature 46 of magnetically susceptible material is pivoted at 47 on pivot bracket 48 and is urged toward open position remote from relay switch-closing coil 41 by helical tension spring 50 acting between spring abutment 51 on the armature and spring abutment 52 on the bracket.

An insulating block 53 mounted on the armature supports movable contact elements 54 and 55 which are "floating" on the insulator to permit overtravel of the armature by virtue of the action of studs 56 extending from the insulating block through holes in the movable contacts and carrying helical compression springs 57 which urge the movable contacts toward the insulating block. The movable contacts are connected together in series by leads 58 and 60 and terminal 61.

Each of the movable contacts cooperates with a fixed contact 62 or 63 in closed position of the movable contacts. Relay switch-closing coil 41 is connected by terminals 64 and 65.

When the armature is in closed position and the relay switch-opening or latch coil 42 is deenergized, magnetically susceptible latch 66 pivoted at 67 on the relay base engages over latching abutment 68 on the insulating block under the action of leaf spring 70 mounted at 71 on the relay base and acting on the latch to hold the armature in closed position. When the relay latch coil 42 is energized, latch 66 is urged toward the latch coil and releases the latch allowing the armature to move to open position and open the movable contacts 54 and 55. The switch-opening or latch coil is connected by terminals 72 and 73.

In operation, if we assume that initially the measuring container is empty, and the timer revolves to throw the switch to normal position, movable contact 40 moves to the normally closed position engaging fixed contact 37, thus deenergizing relay switch-closing coil 41 and deenergizing outlet valve solenoid 30 so that the outlet valve closes. Inlet valve solenoid 24 is energized and opens since relay switch 43 is closed due to the relay latch, and liquid from a tank or other suitable source of chemical solution desirably under gravity pressure enters the measuring column 26.

The liquid flows upward until it reaches the predetermined level in the measuring column, after which liquid contact switch 27 closes by conduct of current through the liquid (water), energizing relay switch-opening or latch coil 42, which releases the relay latch and allows the relay switch 43 to move to normally open position under spring action.

As soon as relay switch 43 opens, inlet valve solenoid 24 is deenergized and the inlet valve closes. This at the same time deenergizes the latch coil 42 of the relay.

There is now a charge of chemical solution in the measuring container and it remains there as the timer continues to advance whenever the control switch 34 is closed.

The timer cam now reaches its high position, and the normally closed switch 37 of the timer opens and the normally open switch 38 of the timer closes. This energizes the relay switch-closing coil, closing the relay switch and energizing the outlet valve solenoid 30 to open the outlet valve. At the same time that relay switch 43 closes, the relay latch 66 drops, locking the relay switch mechanically in the closed position. The chemical solution then flows out the outlet valve. As the solution leaves the measuring container, liquid contact switch 27 opens.

This cycle goes on periodically.

It will thus be understood that though a timer is operating, the timer only operates in the preferred embodiment when the main system is functioning so the increments of chemical feed are proportional to the use of the main system.

In a system of this kind there is little change in concentration, and in fact the concentration remains quite uniform because the following variables are adjusted with respect to the rate of blowdown:

(1) The concentration of the chemical solution fed.
(2) The volume in the measuring column at which the liquid contact valve stops the filling.
(3) The time at which the timer feeds the next increment.

In a system of this kind, blowdown is normally made to be proportional to the operation of the circulating pump.

The device is very simple because a gravity feed can be used.

The relay used in the invention is preferably of the type known as a latch relay with electrical reset, and sometimes called a memory relay with mechanical latch and electrical relays. A suitable type of relay is Struthers Dunn, Inc. 51 HXX Midget latch relay 60 cycles A. C. 115 volts, one pole normally open, double break contacts.

In view of our invention and disclosure, variations and modifications to meet individual whim or particular need will doubtless become evident to others skilled in the art, to obtain all or part of the benefits of our invention without copying the structure shown, and we therefore claim all such insofar as they fall within the reasonable spirit and scope of our claims.

Having thus described our invention, what we claim as new and desire to secure by Letters Patent is:

1. A liquid dispensing system including a source of liquid under pressure and a discharge pipe through which the liquid is dispensed to a main system, in combination with a measuring container, an inlet valve between the source and the measuring container, an outlet valve between the measuring container and the discharge pipe, electrical means operative when the measuring container is empty for closing the outlet valve and opening the inlet valve in response to a timer, electrical means responsive to the level of the liquid in the measuring container for closing the inlet valve including a liquid contact switch, said means including a relay having a relay switch-opening coil in a circuit branch in series with the liquid contact switch, having a relay switch in series with the liquid contact switch, and having a relay switch-closing coil, the electrical means for opening and closing the valves including solenoids, a timer having a normally closed switch and a normally open switch, the normally closed switch being in a circuit branch in series with the inlet valve solenoid and with the relay switch and in parallel with the series-connected relay switch-opening coil and liquid contact switch, the normally open switch being in series with two circuit branches, one including the outlet valve solenoid and the other including the relay switch-opening coil, and electrical means responsive to the timer for opening the outlet valve.

2. A system of claim 1, in combination with a circulating pump for circulating liquid in the main system to which the liquid is dispensed, and a control switch for the circulating pump, the control switch also operating the dispensing system.

3. A liquid dispensing system including a source of liquid under pressure and a discharge pipe through which the liquid is dispensed to a main system, said main system including a main electrical system, in combination with a measuring container, an inlet valve between the source and the measuring container, an outlet valve between the measuring container and the discharge pipe, electrical means operative when the measuring container is empty for closing the outlet valve and opening the inlet valve, electrical means responsive to the level of the liquid in the measuring container for closing the inlet valve, a timer, means operated by the main electrical system when it is in operation for actuating the timer, and electrical means responsive to the timer for opening the outlet valve, whereby the time at which the outlet valve will open is determined by the total elapsed time of operation of the main electrical system since the last previous opening of the outlet valve.

4. A system of claim 3, in which the electrical means for closing the outlet valve and opening the inlet valve is responsive to the timer.

5. A system of claim 4, in which the electrical means for closing the inlet valve includes a liquid contact switch.

References Cited in the file of this patent

UNITED STATES PATENTS

| | | |
|---|---|---|
| 2,380,884 | Von Stoeser et al. | July 31, 1945 |
| 2,411,309 | Whitcomb et al. | Nov. 19, 1946 |